US006931602B1

(12) United States Patent
Silver et al.

(10) Patent No.: US 6,931,602 B1
(45) Date of Patent: Aug. 16, 2005

(54) APPROACH FACILITATING THE SELECTION OF VARIOUS MACHINE VISION FUNCTIONALITY FROM AMONG DIFFERENT PLATFORMS

(75) Inventors: William Silver, Weston, MA (US); Raymond A. Fix, Natick, MA (US); Aaron S. Wallack, Natick, MA (US)

(73) Assignee: Cognex Corporation, Natick, MA (US)

( * ) Notice: Subject to any disclaimer, the term of this patent is extended or adjusted under 35 U.S.C. 154(b) by 393 days.

(21) Appl. No.: 09/741,848

(22) Filed: Dec. 22, 2000

(51) Int. Cl.[7] .............................................. H04N 17/00
(52) U.S. Cl. ....................................... 715/771; 715/964
(58) Field of Search ................................ 345/771–773, 345/705–715, 821–824, 780, 970, 964, 966, 345/740, 741, 745–747, 719–726; 717/1; 600/407

(56) References Cited

U.S. PATENT DOCUMENTS

| | | | | |
|---|---|---|---|---|
| 5,940,296 | A | * | 8/1999 | Meyer ......................... 364/188 |
| 5,956,419 | A | * | 9/1999 | Kopec et al. ................ 382/159 |
| 5,963,212 | A | * | 10/1999 | Bakalash ..................... 345/424 |
| 5,999,213 | A | * | 12/1999 | Tsushima et al. ........... 348/180 |
| 6,088,731 | A | * | 7/2000 | Kiraly ......................... 709/229 |
| 6,125,385 | A | * | 9/2000 | Wies et al. .................. 709/203 |
| 6,161,126 | A | * | 12/2000 | Wies et al. .................. 709/203 |
| 6,256,773 | B1 | * | 7/2001 | Bowman-Amuah ............ 717/1 |
| 6,278,433 | B2 | * | 8/2001 | Narui ......................... 345/112 |
| 6,298,474 | B1 | * | 10/2001 | Blowers et al. ................ 717/1 |
| 6,380,949 | B2 | * | 4/2002 | Thomas et al. .............. 345/705 |
| 6,522,906 | B1 | * | 2/2003 | Salisbury et al. ............ 600/407 |

OTHER PUBLICATIONS

Coillot et al., "A Multi-Spatial Model of Man Machine Couperation," for *Systems, Man, and Cybernetics* pp 373-378, 1993.*

* cited by examiner

*Primary Examiner*—Steven Sax

(57) ABSTRACT

A method and apparatus are provided to improve upon accessibility of machine vision tools. More specifically, improved methods and apparatuses are presented to allow a user to select, via a user interface of a web browser included in a given computer, a machine vision tool. Via the web browser, the user can select training information to be used for training. The selected training information can then be sent to a machine vision tool computer which includes a machine vision tool. The web browser can then send a command to the machine vision tool computer to train the machine vision tool using the selected training information. Other aspects of the invention are directed toward a method or apparatus that allows a user to select, via a user interface which may comprise a web browser included in a given computer, parameters for running a machine vision tool and a machine vision tool. Using the web browser, the user can then cause the machine vision tool to be executed and use the selected parameters. The results of the executed machine vision tool are then sent to the given device which includes the web browser.

51 Claims, 10 Drawing Sheets

```
PATMAX RUN PARAMETERS
NAME: MY PARAMETERS
ACCEPT THRESHOLD    0.5
CONTACT THRESHOLD   10
☒ SCORE USING CLUTTER
NUMBER TO FIND      1
TIMEOUT      1000ms
```

| DOF | NORMAL | LOW | HIGH |
|---|---|---|---|
| ☒ ANGLE | 0 | -45 | +45 |
| ☐ UNIFORM SCALE | 0.8 | 1 | 1.2 |
| ☐ X SCALE | 0.9 | 1 | 1.2 |
| ☐ Y SCALE | 0.8 | 1 | 1.2 |

OK ~1702

FIG. 1
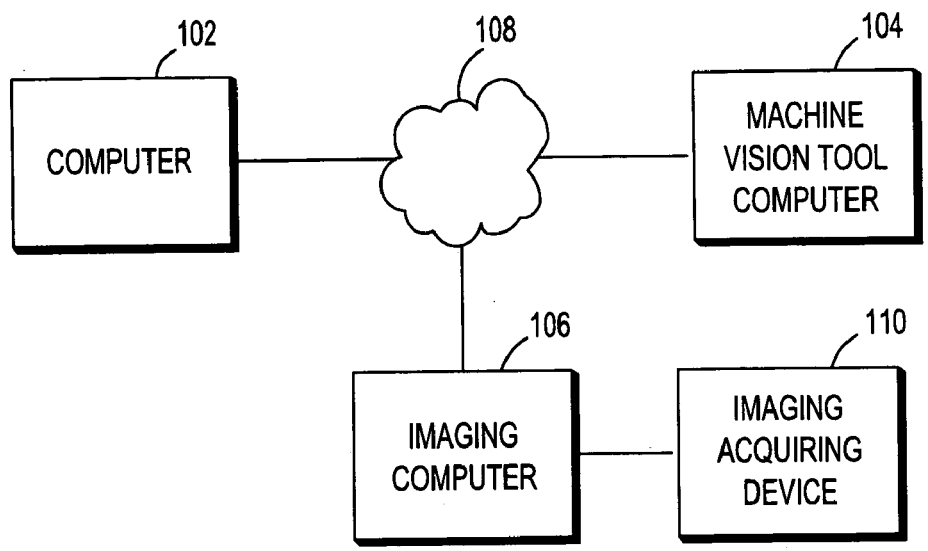
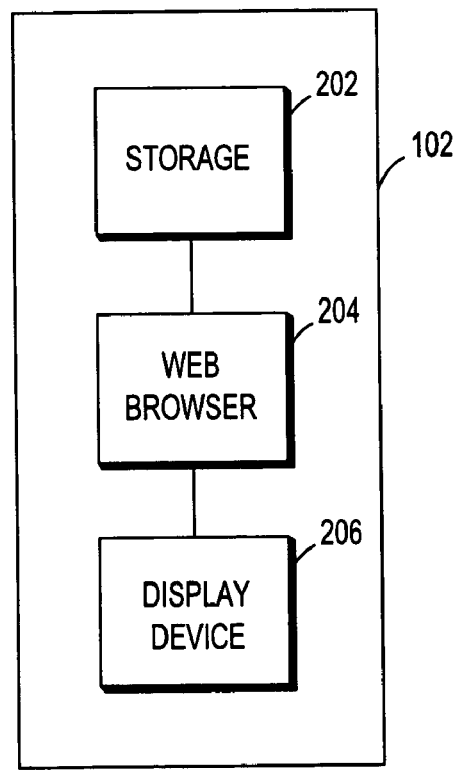
FIG. 2

FIG. 7
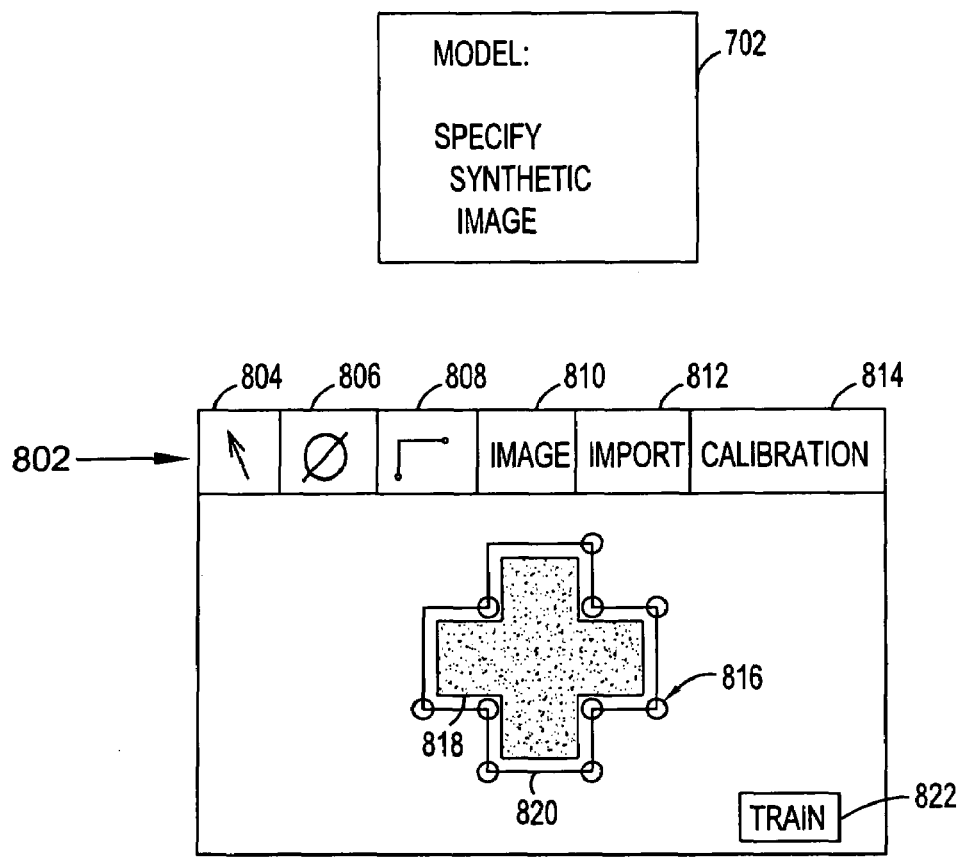
FIG. 8
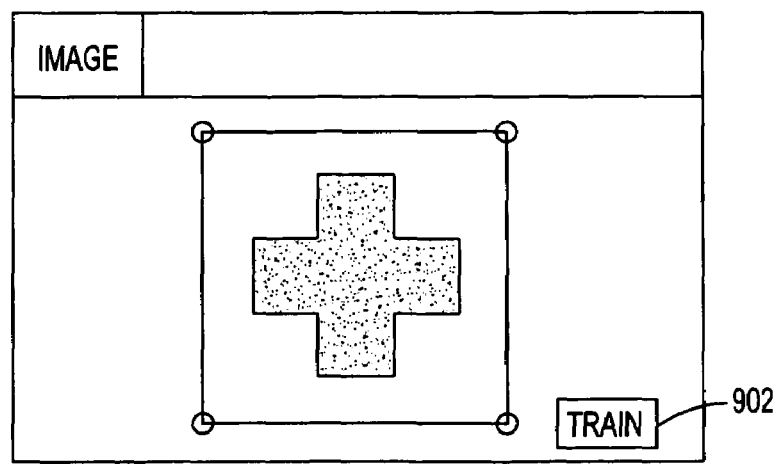
FIG. 9

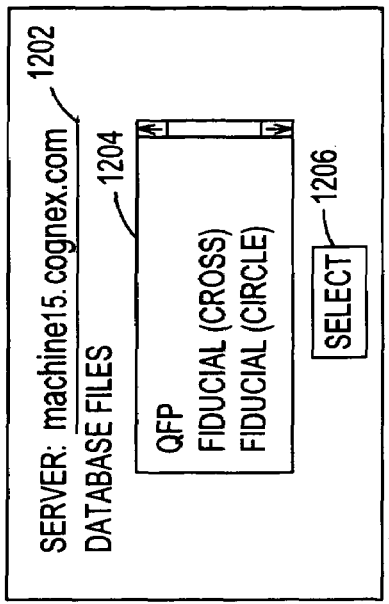
FIG. 12
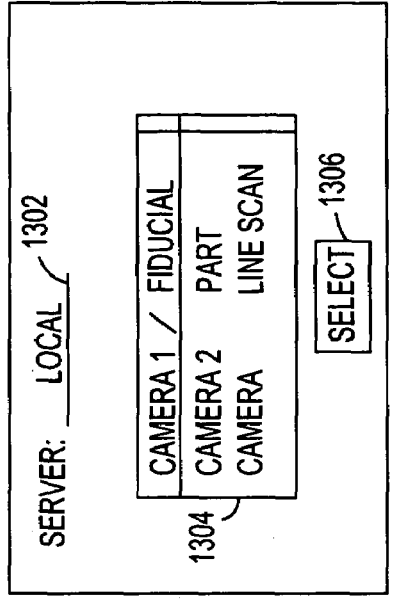
FIG. 13
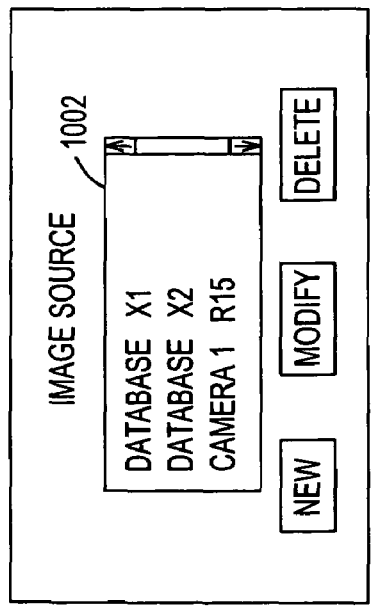
FIG. 10
FIG. 11

FIG. 17

```
                PATMAX RUN PARAMETERS
    NAME: MY PARAMETERS
    ACCEPT THRESHOLD      0.5
    CONTACT THRESHOLD     10
    ☒ SCORE USING CLUTTER
    NUMBER TO FIND        1
    TIMEOUT       1000ms

DOF            NORMAL     LOW      HIGH
    ☒ ANGLE          0         -45      +45
    ☐ UNIFORM SCALE  0.8        1       1.2
    ☐ X SCALE        0.9        1       1.2
    ☐ Y SCALE        0.8        1       1.2

[ OK ] ~1702
```

```
                   DIAGNOSTICS
    NAME:   GRAPHICS DIAGS.
       ☒    SHOW INPUTS
       ☒    SHOW OUTPUTS
       ☒    SHOW INTERMEDIATE STEPS

APPROACH FACILITATING THE SELECTION OF VARIOUS MACHINE VISION FUNCTIONALITY FROM AMONG DIFFERENT PLATFORMS

COPYRIGHT NOTICE

This patent document contains information subject to copyright protection. The copyright owner has no objection to the facsimile reproduction by anyone of the patent document or the patent, as it appears in the U.S. Patent and Trademark Office files or records, but otherwise reserves all copyright rights whatsoever.

BACKGROUND OF THE INVENTION

1. Field of the Invention

The present invention generally relates to the field of machine vision.

2. Description of Background Information

Machine vision applications are typically run on a single platform. All the required machine vision functionality is typically run on one such local platform, and other platforms are typically not able to access or control such functionality, or even part of it. The platform may comprise, e.g., one or a set of connected processors. If there is a need for machine vision analysis at a remote location—e.g., at a different part of the building, across town, or in a different part of the country—a separate platform is typically used upon which both machine vision tools and a control interface are run.

SUMMARY OF THE INVENTION

Mechanisms are needed to give access to machine vision functionality provided on separate and remote computers. For example, an interface may be provided that gives users with a given user computer, carrying a standard interface (e.g., a web browser), access to machine vision functionality not available on the given user computer.

The present invention accordingly improves upon the accessibility of machine vision tools. Certain aspects of the invention are directed to improved methods or systems (or subparts thereof) that allow a user to select, via a standard user interface which may comprise a web browser included in a given computer, a machine vision tool stored on a separate platform. Via the web browser, the user can select training information to be used for training. The selected training information can then be sent to a machine vision tool computer which includes a machine vision tool. The web browser can then send a command to the machine vision tool computer to train the machine vision tool using the selected training information.

Other aspects of the invention are directed toward methods or systems (or subparts thereof) that allow a user to select, via a user interface which may comprise a web browser included in a given computer, parameters for running a machine vision tool and a machine vision tool. Using the web browser, the user can then cause the machine vision tool to be executed and use the selected parameters. The results of the executed machine vision tool are then sent to the given device which includes the web browser.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 1 illustrates a system level view of an embodiment of the invention;

FIG. 2 illustrates a detailed view of a given computer of FIG. 1;

FIG. 7 illustrates a popup window of a web page in an embodiment of the invention;

FIG. 8 illustrates a window showing a training image including a wire frame;

FIG. 9 illustrates a window showing a training image;

FIG. 10 illustrates a web page for selecting an image source;

FIG. 11 illustrates a web page for entering a new image source;

FIG. 12 illustrates a web page for entering a database file as an image source;

FIG. 13 illustrates a web page for entering a camera as an image source;

FIG. 17 illustrates a web page for entering runtime parameters for a machine vision tool;

FIG. 18 illustrates a web page for specifying desired diagnostics for running the machine vision tool;

DETAILED DESCRIPTION

Figure 3:
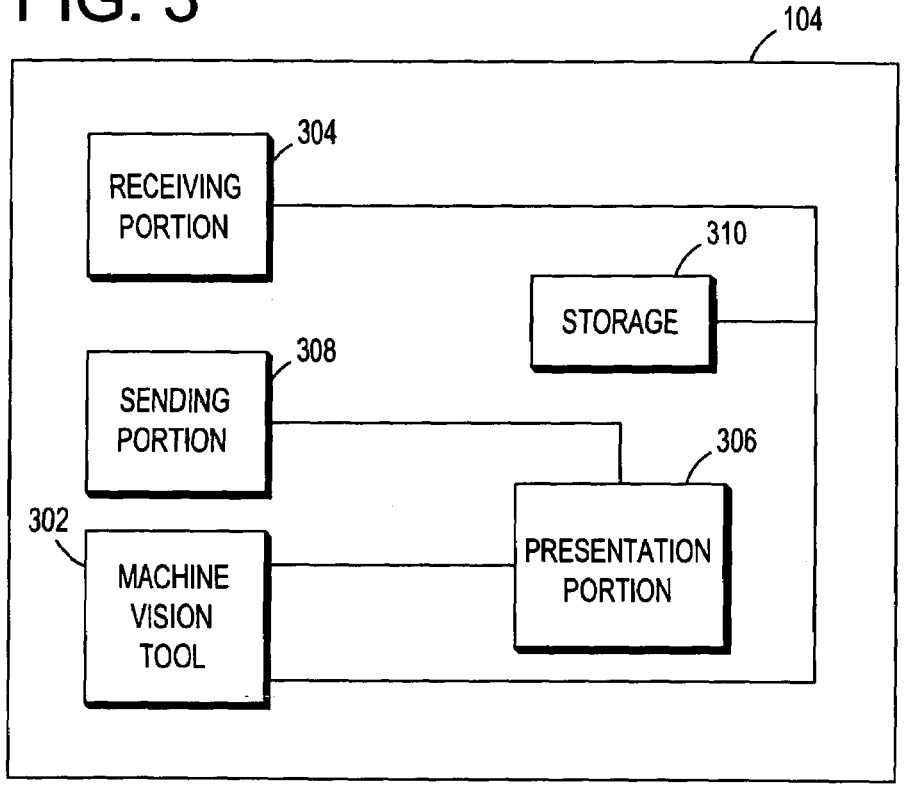
FIG. 3 illustrates a detailed view of the machine vision tool computer of FIG. 1.

FIG. 1 illustrates an embodiment of the invention. A computer 102 communicates with a machine vision tool computer 104 via a network 108. The network 108 may be, for example, a network of interconnected networks, such as the Internet, an intranet, a local area network (LAN) and/or a wide area network (WAN). In the illustrated embodiment, network 108 comprises the Internet.

The imaging computer 106 is connected to an image acquiring device 110. The image acquiring device 110 may be, for example, a digital camera.

FIG. 2 illustrates a detailed view of computer 102. The computer 102 includes storage 202 which may be, for example, a random access computer memory or storage space on a disk in a hard drive. The computer 102 also includes a web browser 204 or a thin client. The web browser 204 displays data and is capable of communicating with other computers via a network, such as, for example, the Internet or an intranet. The web browser 204 provides a user with a way to navigate, via, for example, hyperlinks which are selected by a pointing device, such as a computer mouse, or are typed in by the user. The web browser uses a transfer protocol, for example, HyperText Transfer Protocol (HTTP) or File Transfer Protocol (FTP), to transmit data of various content, such as, for example, Hypertext Transfer Markup Language (HTML) documents, plain text documents, graphic images, and eXtensible Markup Language (XML) documents. The web browser 204 may also run programs, such as Java applets. The web browser 204 may be, for example, Internet Explorer by Microsoft Corporation of Redmond, Wash., Netscape Navigator by Netscape, or any other web browser. A display device 206 of the computer 102 is used by the web browser 204 to present a display to a user.

A thin client utilizes a two or more tiered client server model. In this model, the client runs a minimal set of services that provide functionality to interface with at least one server. A web browser may be a thin client.

FIG. 3 illustrates a more detailed view of machine vision tool computer 104. Machine vision tool computer 104 includes at least one machine vision tool 302 which receives input via receiving portion 304. Machine vision tool 302 produces output which is received by presentation portion 306 which places the output in a format for a presentation display and sends the formatted output to sending portion 308 to be sent through network 108 to the computer 102 which includes the web browser 204.

Figure 4:
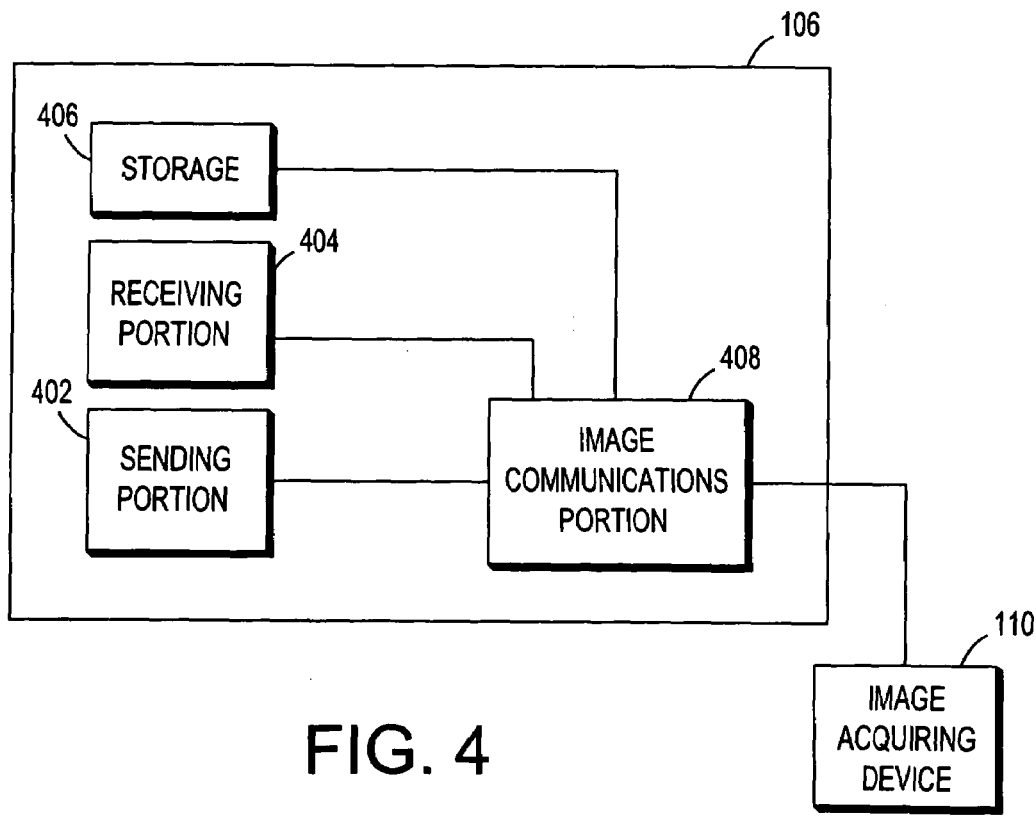
FIG. 4 illustrates a detailed view of the imaging computer of FIG. 1.

FIG. 4 provides a detailed view of imaging computer 106. Imaging computer 106 includes a sending portion 402 to send imaging information over the network 108, a receiving portion 404 to receive information from the network 108, and a storage area 406. The storage area 406 may be, for example, a random access computer memory and/or space on a disk in a hard drive. Image communications portion 408 communicates with the sending portion 402, the receiving portion 404, and the storage 406, and also communicates with image acquiring device 110.

Figure 5:
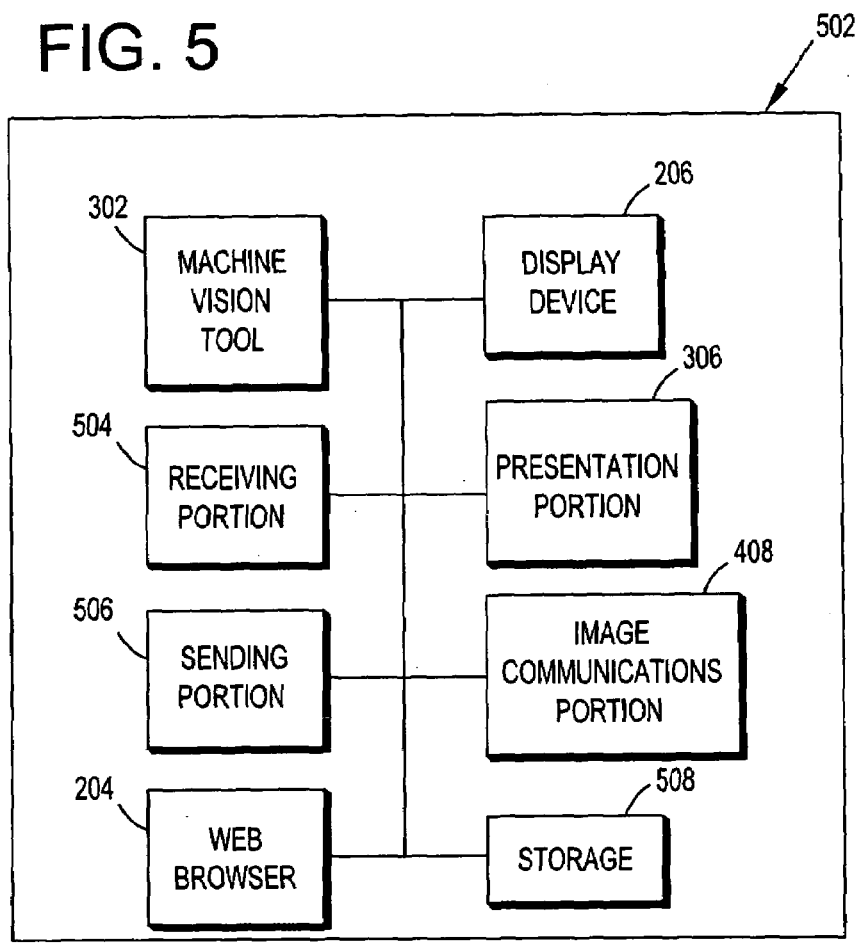
FIG. 5 illustrates a second embodiment of the invention.

FIG. 5 illustrates another embodiment of the invention which is similar to that of FIG. 1, but which replaces machine vision tool computer 104 and imaging computer 106 with computer 502. Computer 502 includes a machine vision tool 302 which presents output to a presentation portion 306 to place the machine vision tool output in a form for a presentation display. A receiving portion 504 is for receiving information from web browser 204 and for sending the information to machine vision tool 302. Sending portion 506 is for receiving information from presentation portion 306 to send the information to web browser 204. Image communications portion 408 is for communicating with an image acquiring device 110 and sending portion 506 and receiving portion 504. Storage 508 may be, for example, a random access computer memory or disk space on a disk in a hard drive.

A web browser displays data and is capable of communicating with other computers via a network, such as, for example, the Internet or an intranet. The web browser provides a user with a way to navigate, via, for example, hyperlinks which are selected by a pointing device, such as a computer mouse, or are typed in by the user. The web browser uses a transfer protocol, for example, HyperText Transfer Protocol (HTTP) or File Transfer Protocol (FTP), to transmit data of various content, such as, for example, Hypertext Transfer Markup Language (HTML) documents, plain text documents, graphic images, and extensible Markup Language (XML) documents. The web browser may also run programs, such as Java applets. The web browser may be, for example, Internet Explorer by Microsoft Corporation of Redmond, Washington, Netscape Navigator by Netscape, or any other web browser.

Figure 6:
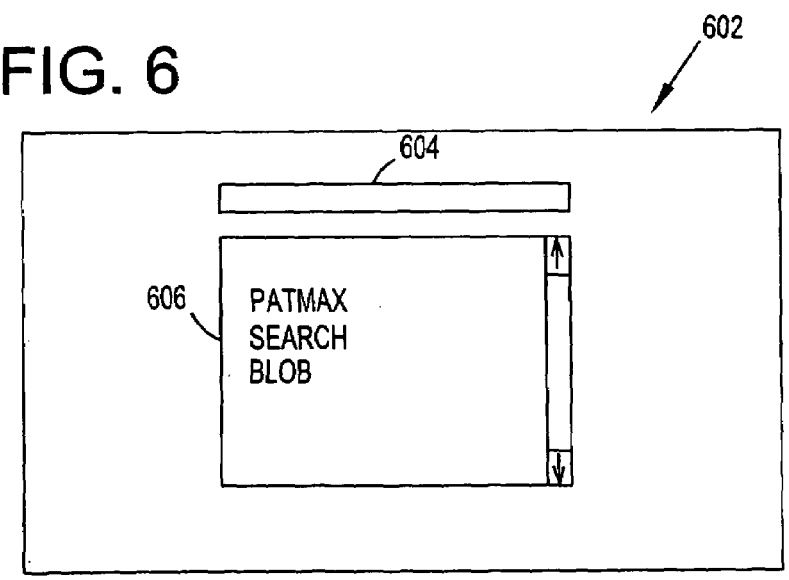
FIG. 6 illustrates a sample web page produced by an embodiment of the invention.

A user of a web browser may, for example, type an address of a computer, which includes a desired machine vision tool, or the user may select the computer including the machine vision tool by selecting the machine vision tool computer's address via a bookmark of the browser. In an embodiment of the invention, as shown in FIG. 6, a web page 602 is displayed via the web browser 204 after selecting the computer, including the machine vision tool, either through, for example, the bookmark or by typing the URL of the machine vision tool computer in window 604.

After selecting the machine vision tool computer, window 606 is displayed via the web browser 204. Window 606 displays a listing of machine vision tools which reside on the machine vision tool computer. In the example shown in the FIG. 6, the listed machine vision tools include PatMax®, Search and Blob. The above mentioned tools are available through Cognex Corporation of Natick, Massachusetts. However, any machine vision tool may be listed, including those not developed by Cognex Corporation.

The machine vision tool may be selected by using a pointing device, for example, a computer mouse and clicking on the selected tool. After selecting a machine vision tool, for example, PatMax, a pop up menu, a new window or web page 702 is displayed, as shown in FIG. 7. In this embodiment, a user using a pointing device, for example, the computer mouse, points to and clicks on either synthetic or image to select a type of training model.

If synthetic is selected, a web page, as shown in FIG. 8, is displayed. The web page may include, for example, a JAVA applet or JAVA script. In the example shown in FIG. 8, a JAVA applet provides functionality to allow a user to drag a wire frame over an image. Controls 802 allow the user to manipulate wire frames.

The produced web page may also include JAVA script commands as well as Hypertext Markup Language (HTML) and Extended Markup Language (XML), all of which are well known in the art. JAVA script commands or ECMAScript commands may be used to perform vision parameter checking locally before passing the parameters from the web browser to the machine vision tool computer.

By selecting control 804 with a pointing device, the user may select a portion of the figure by selecting and dragging over that portion of the figure.

By selecting control 806 with a pointing device, the user may remove a feature from the displayed image. For example, a user may select, using a computer mouse and dragging over the desired area, a portion of the displayed image and select control 806 to delete that portion.

By selecting control 808 via the pointing device, the user may add a feature to the image. For example, the user may select a portion of a wire frame and then select control 808 to create an angle at that portion of the wire frame such that two portions of the wire frame intersect at that point.

By selecting, via the pointing device, control 812, the user may select an external file which includes training information, for example, a file containing a pattern or a Data eXchange Format (DXF) file containing a set of points. The DXF file may include, for example, AutoCAD data. DXF was developed by Autodesk, Inc, of San Rafael, CA and can be imported and exported from the program AutoCAD®.

By selecting control 814 via the pointing device, the user can select the calibration of the image. For example the user may specify a mapping of physical units to pixels.

Figure 21:
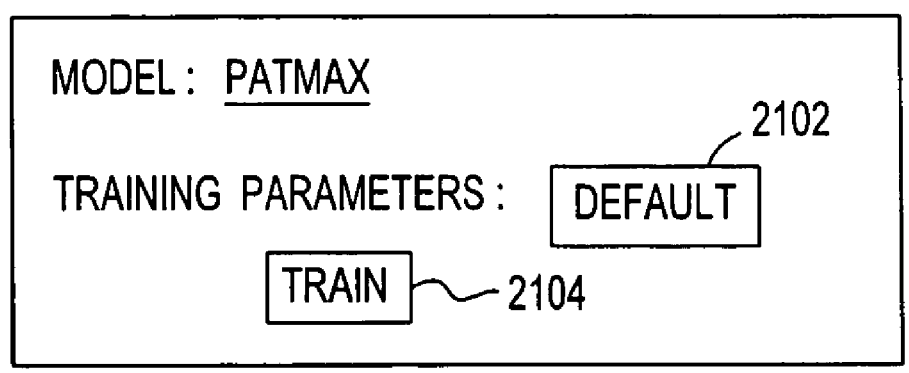
FIG. 21 illustrates a web page for providing training information to a machine vision tool and for causing the machine vision tool to be trained.

By selecting the train control 822, via the pointing device, a command is sent to the machine vision tool computer 104. The machine vision tool computer then sends a web page, such as that shown in FIG. 21 to allow a user to enter training parameters. The user enters the name of the machine vision tool to train. In this example, PatMax is entered. FIG. 21 shows that default training parameters will be used unless the user overrides the defaults.

If the user wishes to enter training parameters, for example, PatMax training parameters, by selecting the "train" parameter field 2104, a pop up menu, a new window or web page appears showing a list of PatMax training parameter objects. If a desired parameter object is not listed, the user may selects via the pointing device "new", which is listed among the choices. If the user selects "new", a display, such as that shown in FIG. 22 is displayed via the web browser 204.

Figure 22:
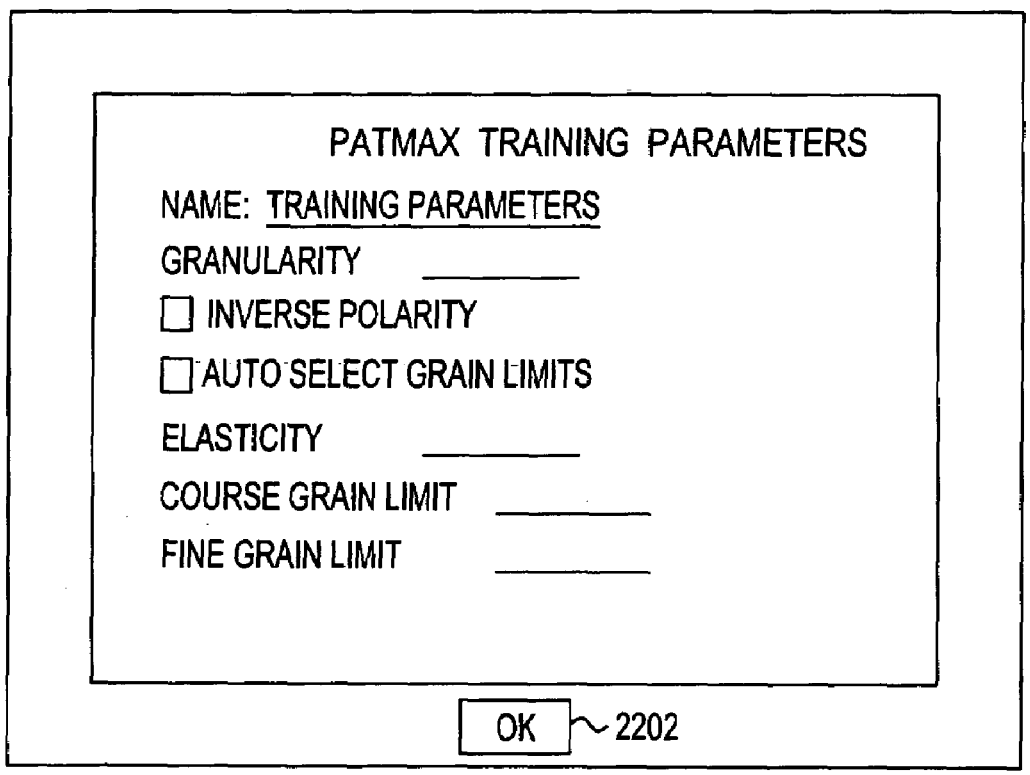
FIG. 22 illustrates a web page for entering training parameters for a machine vision tool.

Using PatMax training parameters, as an example in the parameters display shown in FIG. 22, the user enters a name for the training parameters object, for example, "training parameters" and various training parameters specific to the machine vision tool, for example, granularity, inverse polarity, auto select grain limits, elasticity, course grain limit and fine grain limit may be selected or entered. After all parameters are entered, the user then, for example, via the pointing device, selects "Ok" 2202. The parameter information is then sent via a command including a CGI message to the machine vision tool computer.

Once train 2104 is selected via the pointing device, the train command may be sent to the machine vision computer via a Computer Gateway Interface (CGI) command, as is well known to those of ordinary skill in the art. When the train command is sent to the machine vision tool computer, the machine vision tool computer trains, using the training information to produce a trained model. The trained model may then be stored on the machine vision tool computer in a storage area 310 or may be sent to the computer 102 to be stored in storage area 202.

If, for example, the user selects "image" from the display of FIG. 7, a display such as shown in FIG. 10 is displayed via the web browser 204. The display shows a window 1002 which displays all possible types of image sources. If the user selects "new" via the pointing device, a display such as shown in FIG. 11 is displayed via the web browser 204. The user would type the name of the image source in window 1102, select a type of image source, for example, database, camera, URL or file, and select, via, for example, the pointing device, a "create" control 1104 to create the image source.

If the user creates a new image source and selects "database", a screen, such as shown in FIG. 12 is displayed. The user can then enter a server at location 1202 of the display. A listing of database files 1204 is displayed indicating the database files that reside on the server. A user may scroll the display up or down to find a desired file. After finding the desired file, the user selects the file, for example, via the pointing device and then selects control 1206 to select the desired file.

If the user selects "camera" from the display of FIG. 11, a display such as shown in FIG. 13 is displayed via the web browser 204. At 1302 a user may enter a server name or a key word, such as "local" to access local resources. A list of camera resources available at the server appears in a window 1304 of the web browser. Contents of the list depend on the resources of the selected server. The user selects, via the pointing device, one of the listed resources in window 1304 and then selects, via the pointing device, a "select" control 1306 to cause a command to be sent to the machine vision tool computer indicating which image source has been selected. The command sent to the machine vision tool computer includes a CGI message with the selected image source information.

Figure 14:
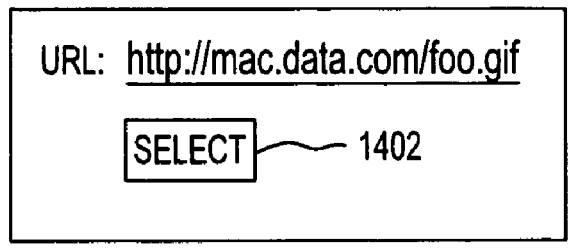
FIG. 14 illustrates a web page for entering a URL as an image source.

If the user selects "URL" from a display, such as that shown in FIG. 11, a display such as that shown in FIG. 14 is displayed via the web browser 204. The user may then enter a pathname of a desired file and then, for example, via the pointing device, choose "select" control 1402 to select the desired file.

Figure 15:
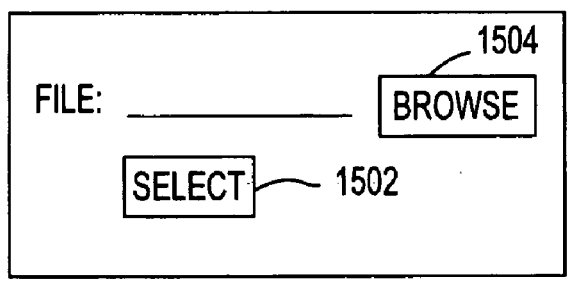
FIG. 15 illustrates a web page for selecting a file as an image source.

If the user selects "file" via the display of FIG. 11, a display such as that shown in FIG. 15 is displayed via the web browser. The user may then enter a file name, wherein the file is located locally on the computer including the web browser 204. The user may instead, select a "browse" control 1504, via, for example, a pointing device, to allow the user to browse contents of, for example, a local hard disk and via the pointing device, select a desired file. After indicating the desired file, the user, for example, via the pointing device, may indicate the selection by selecting "select" control 1502. The selected file is then sent to the machine vision server tool computer via, for example, a CGI message with a MIME encoded file.

If the user selects "image" from the pop up menu, window or web page of, for example, FIG. 7, a display such as shown in FIG. 9 is displayed via the web browser 204. The figure includes an image, for example, FIG. 9 shows an image of a fudicial cross. A user may, via a pointing device, select a region of interest on the display, such as shown in FIG. 9, by clicking and dragging via the pointing device over the area of interest. FIG. 9 shows the entire fudicial cross being indicated as a region of interest.

After selecting the region of interest, the user then may, for example, via the pointing device, select the "train" control 902 to send, for example, a command to the machine vision computer. The machine vision computer may then respond by sending a web page, such as shown in FIG. 21 for entering training parameters. The entering of training parameters may be done as previously discussed with reference to FIGS. 21 an 22. By selecting "train" 2104 via, for example, the pointing device, a training command, included in a CGI message is sent to the machine vision tool computer.

After the tool is trained, for example, after selecting train 2101 of FIG. 21, the page where the machine vision tool can be run is returned. The web browser 204 may be redirected to display this returned web page. For example, a display such as that shown in FIG. 16 may be displayed. Tools which do not require training, or tools which have already been trained, can be run from a known web address.

Figure 16:
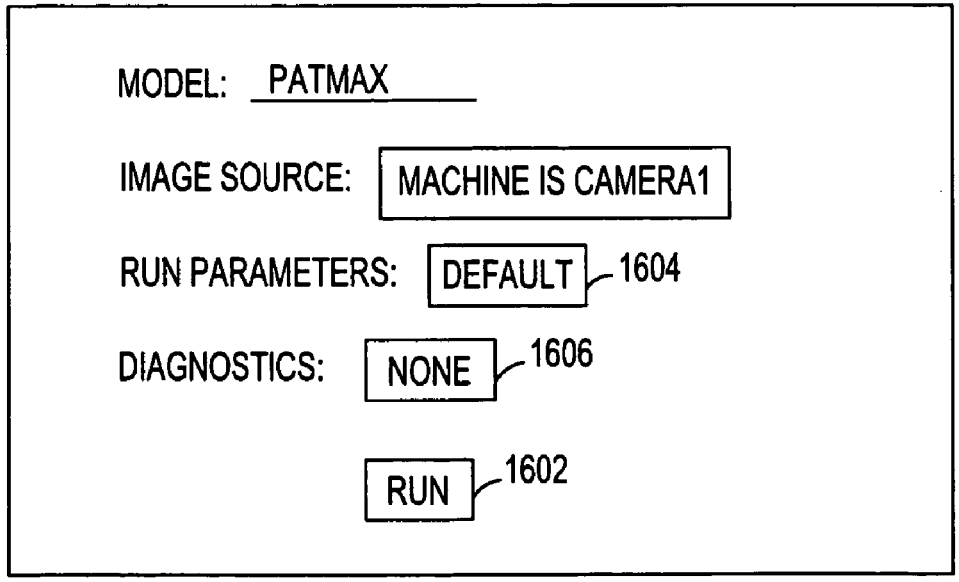
FIG. 16 illustrates a web page for providing information to a machine vision tool and for causing the machine vision tool to be executed.

The user of the web browser may enter an address of a computer which includes a desired run-time machine vision tool, or the user may select the computer including the machine vision tool by selecting the machine vision tool computer's address via a bookmark of the browser. After the computer having a run-time machine vision tool is selected, a display, such as shown in FIG. 16 is displayed via the web browser 204 so that the user may select various options. In the example shown in FIG. 16, the user would enter PATMAX, in the model field, indicating the particular desired machine vision tool. The image source is indicated as camera1, a default is entered for run parameters, and no diagnostics are indicated. Once all desired information is entered, the user selects "run" control 1602 to send a command to the machine vision tool computer, including the selected information, via, for example, a CGI message and causes the machine vision tool to execute.

Figure 20:
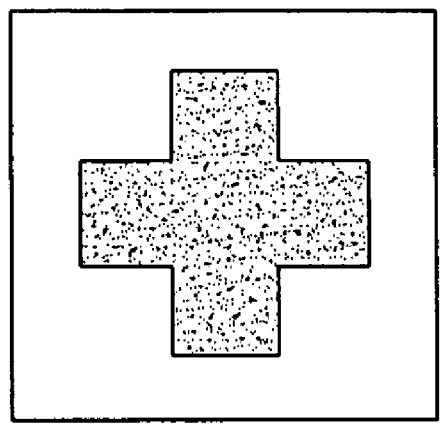
FIG. 20 illustrates an example of a live image displayed via a web browser.

When the machine vision tool executes, a display, such as shown in FIG. 20, may be displayed on the display device 206 and updated via the machine vision tool computer which forwards an updated acquired image from the acquiring device 110 at periodic intervals. Thus, the user may see a live image of the object.

If the user wishes to enter run parameters, for example, PatMax run parameters, by selecting the "run" parameter field 1604, a pop up menu, a new window or web page appears showing a list of PatMax run parameters. If a desired parameter is not listed, the user may select, via the pointing device "new", which is listed among the choices. If the user selects "new", a display, such as that shown in FIG. 17 is displayed via the web browser 204.

Using PATMAX run parameters, as an example in the parameters display shown in FIG. 17, the user enters a name for the run parameters, for example, "my parameters" and various parameters specific to the machine vision tool, for example, accept threshold, contact threshold, score using clutter, number to find, timeout, DOF, angle, uniform scale, X scale and Y scale. After all parameters are entered, the user then, for example, via the pointing device, selects "Ok" 1702. The parameter information is then sent via a command including a CGI message to the machine vision tool computer.

Similarly, a user may select the diagnostics field of a display, such as FIG. 16, to indicate diagnostics. Once the diagnostic field 1606 is selected, for example, via a pointing device, a pop up menu, a new window or a web page of available diagnostics appears. If a desired diagnostic appears, the user may select the diagnostic via the pointing device. If the desired diagnostic does not appear, the user may select, via the pointing device, "new" which is listed among the possible choices. If "new" is selected, a display such as that shown in FIG. 18 is displayed via the web browser 204.

As shown in FIG. 18, a user may enter a name of a diagnostic, for example, "graphics diags", and then may enter various parameters, such as, "show inputs", "show outputs", and "show intermediate steps". Once all parameters are entered, the user selects the "Ok" control 1802 which causes a message including a CGI message with the diagnostic information to be sent to the machine vision tool computer.

Figure 19:
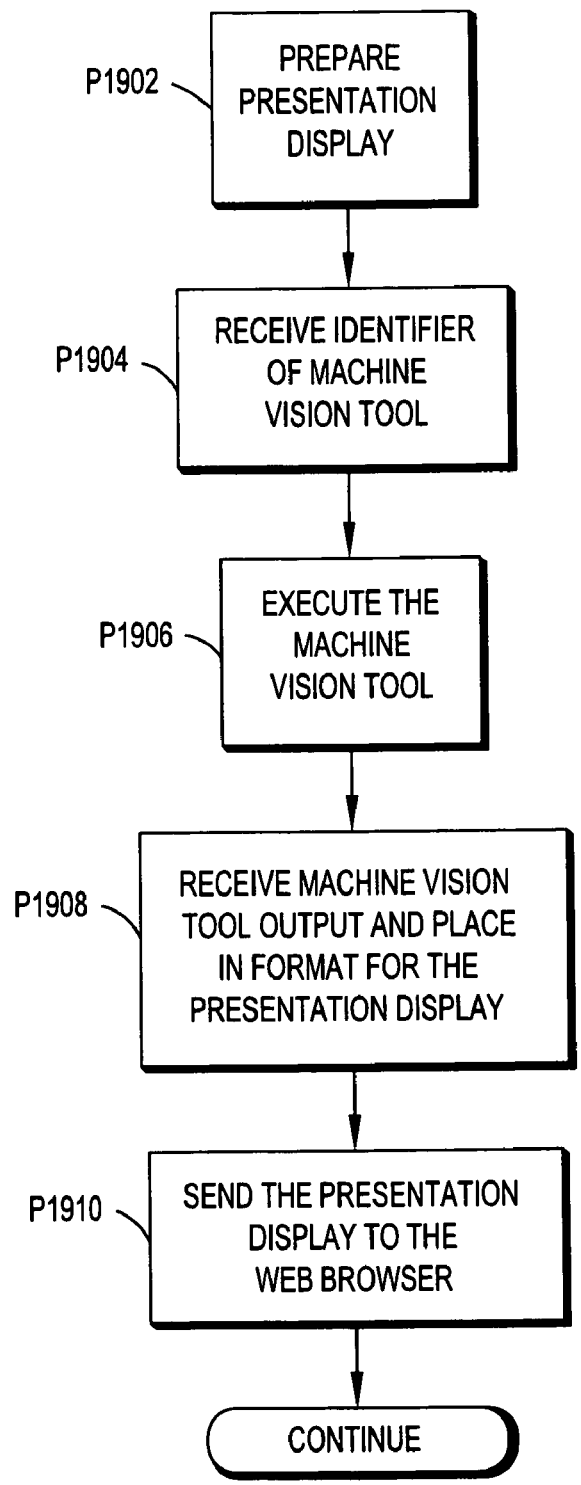
FIG. 19 is a flowchart which illustrates processing in the machine vision tool computer.

FIG. 19 illustrates processing in an embodiment of the invention in a machine vision tool computer. At P1902, the user, the via the web browser 204, indicates a URL of the machine vision tool computer. The machine vision tool computer receives a message from the web browser requesting a web page. The machine vision tool computer prepares a presentation display for the web browser, such as that shown in the FIG. 6 and sends the display to the web browser.

At P1904 the user indicates a desired machine vision tool via the web browser and the identifier of the machine vision tool is received by the machine vision tool computer.

After the machine vision tool is trained and various parameters selected, as described above, the user, via the web browser 204, indicates that the machine vision tool is to be executed, the machine vision tool computer receives the execution command and executes the machine vision tool at P1906.

At P1908 the machine vision tool has been executed and the output of the machine vision tool is placed in a format for presentation on the web browser 204 by the presentation portion 306.

At P1910, sending portion 308 receives the output of the presentation portion 306 and sends the presentation display to web browser 204.

The processing as described above may be performed via software, hardware, firmware, or any combination of the above. Any data handled in the processing or created as a result of the processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structure and of such data.

While the invention has been described with reference to certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

We claim as our invention:

1. A method for interoperably training a machine vision tool remotely via a network, the method comprising:

selecting, via a user interface running on a local computing platform connected to the network, a machine vision tool on a remote computing platform accessible via the network;

selecting, via the user interface running on the local computing platform connected to the network, machine vision tool training parameter information to be used for training the machine vision tool on the remote computing platform accessible via the network, including:

selecting, using the user interface running on the local computing platform connected to the network, an image acquiring device to acquire an image of an object, the image acquiring device being connected to an image communications device on a second remote computing platform accessible via the network;

acquiring the image using the image acquiring device and sending the image to the image communications device;

sending the image via the network from the image communications device to the machine vision tool on the remote computing platform connected to the network;

sending the image via the network from the machine vision tool on the remote computing platform to the local computing platform running the user interface;

displaying the image on a display device of the local computing platform connected to the network; and selecting a region of interest of the image via the user interface presented by the user interface running on the local computing platform connected to the network;

sending, via the user interface running on the local computing platform connected to the network, the selected machine vision tool training parameter information to the machine vision tool on the remote computing platform; and commanding, via the user interface running on the local computing platform connected to the network, the remote computing platform to train the machine vision tool using the selected machine vision tool training parameter information, whereby the machine vision tool has been interoperably trained remotely via the network.

2. The method of claim 1, wherein the selecting of the machine vision tool training parameter information includes entering training parameters.

3. The method of claim 1, further comprising:

selecting, using the user interface running on the local computing platform connected to the network, an image communications device on a second remote computing platform accessible via the network;

commanding, using the user interface running on the local computing platform connected to the network, an image acquiring device connected to the image communications device to acquire an image, and to send the image via the network to the machine vision tool on the remote computing platform.

4. The method of claim 3, wherein the remote computing platform and the local computing platform are a same device.

5. The method of claim 3, further comprising:

periodically receiving, on the local computing platform including the-user interface an updated image originating from the image acquiring device; and displaying the updated image via the user interface running on the local computing platform connected to the network to produce a live display of the image.

6. The method of claim 1, further comprising entering at least one parameter, via the user interface running on the local computing platform connected to the network, to send to the remote computing platform before commanding, via the user interface, the remote computing platform to run the machine vision tool.

7. The method of claim 1, further comprising:

selecting, via the user interface running on the local computing platform connected to the network, one of a plurality of devices, each having at least one machine vision tool.

8. The method of claim 1, wherein the local computing platform and the remote computing platform are located remotely from each other, and are each connected to the network.

9. The method of claim 8, wherein the local computing platform and the remote computing platform are connected via at least one of a local area network, a wide area network, and an internet.

10. The method of claim 9, wherein the local computing platform and the remote computing platform are in different buildings.

11. The method of claim 3, wherein the image communications device is separate from the local computing platform and the remote computing platform, and is connected to the network.

12. The method of claim 1, wherein the user interface includes a web browser.

13. The method of claim 1, wherein the user interface includes a thin client.

14. The method of claim 1, wherein the user interface includes a network user interface adapted to provide navigation via hyperlinks.

15. A method for interoperably training a machine vision tool remotely via a network, the method comprising:

selecting a machine vision tool on a remote computing platform accessible via the network via a user interface running on a local computing platform connected to the network;

entering, via the user interface running on a local computing platform connected to the network, machine vision tool training parameter information to be used for training the machine vision tool, the machine vision tool training parameter information including an outline drawn on a screen of a video display device using a pointing device;

sending the machine vision tool training parameter information to the machine vision tool on the remote computing platform accessible via the network;

commanding the machine vision tool, via the user interface running on a local computing platform connected to the network, to use the machine vision tool training parameter information;

producing, via the machine vision tool on the remote computing platform accessible via the network, a trained model based on the machine vision tool training parameter information; and storing the trained model, thereby interoperably training the machine vision tool remotely via the network.

16. The method of claim 15, wherein entering the machine vision tool training parameter information comprises:

entering, via the user interface running on the local computing platform connected to the network, an indicator of a file including the machine vision tool training parameter information; and sending the file to the machine vision tool on the remote computing platform accessible via the network.

17. The method of claim 16, wherein the file is a DXF file and the training information is AutoCAD data.

18. The method of claim 15, wherein the trained model is stored in a storage device associated with the local computing platform connected to the network.

19. The method of claim 15, wherein the trained image is stored in a storage device on the machine vision tool on the remote computing platform accessible via the network.

20. The method of claim 16, further comprising:

producing, via the machine vision tool, a trained model based on the machine vision tool training parameter information; and storing the trained model.

21. The method of claim 20, wherein the trained model is stored in a storage device associated with the local computing platform connected to the network.

22. The method of claim 20, wherein the trained model is stored in a storage device associated with the remote computing platform accessible via the network.

23. The method of claim 15, wherein the user interface includes a web browser.

24. The method of claim 15, wherein the user interface includes a thin client.

25. The method of claim 15, wherein the user interface includes a network user interface adapted to provide navigation via hyperlinks.

26. A method for interoperably running a machine vision tool remotely via a network, the method comprising:
   interoperably selecting via the network, using a user interface running on a local computing platform connected to the network, parameters for running a machine vision tool on a remote computing platform accessible via the network;
   interoperably selecting via the network, using the user interface running on the local computing platform connected to the network, a machine vision tool on the remote computing platform accessible via the network;
   causing, using the user interface running on the local computing platform connected to the network, the machine vision tool on the remote computing platform to be executed, the machine vision tool using the selected parameters;
   sending results of the executed machine vision tool to the local computing platform connected to the network; and
   displaying, using a display device associated with the local computing platform connected to the network, the results of the machine vision tool, the displaying being performed via the user interface running on the local computing platform connected to the network,
   whereby the machine vision tool has been interoperably run remotely via the network.

27. The method of claim 26, wherein the parameters specify one of an image acquired by an image acquiring device and a file in a database.

28. The method of claim 26, wherein the parameters are received from a location selected via the user interface running on the local computing platform connected to the network.

29. The method of claim 26, further comprising:
   entering, using the user interface running on the local computing platform connected to the network, at least one parameter to be passed via the network to the remote computing platform including the machine vision tool; and
   passing the at least one parameter to the machine vision tool on the remote computing platform accessible via the network.

30. The method of claim 26, wherein the user interface includes a web browser.

31. The method of claim 26, wherein the user interface includes a thin client.

32. The method of claim 26, wherein the user interface includes a network user interface adapted to provide navigation via hyperlinks.

33. An apparatus for interoperably running a machine vision tool remotely via a network, the apparatus comprising:
   a remote computing platform accessible via the network, the remote computing platform including a machine vision tool, the remote computing platform being configured to communicate via the network with a local computing platform including a user interface running on the local computing platform that is connected to the network, the remote computing platform further including:
   a receiving portion to receive an identifier of the machine vision tool from the-user interface running on the local computing platform;
   a presentation portion to prepare at least one presentation display to send to the user interface on the local computing platform connected to the network, the at least one presentation display being based on results of executing the machine vision tool on the remote computing platform accessible via the network; and
   a sending portion to send the at least one presentation display to the user interface running on the local computing platform via the network,
   whereby the machine vision tool is capable of interoperably running remotely via the network.

34. The apparatus of claim 33, wherein the presentation portion is configured to receive output from the machine vision tool and to place the output in a form of the at least one presentation display to display via the user interface running on the local computing platform connected to the network.

35. The apparatus of claim 34, wherein:
   the presentation portion is configured to produce the at least one presentation display including commands for displaying the at least one presentation display via the user interface on the local computing platform connected to the network.

36. The apparatus of claim 34, wherein the commands for displaying the at least one presentation display include one of HTML and XML.

37. The apparatus of claim 36, wherein the commands for displaying the at least one presentation display include a program to be executed by the local computing platform connected to the network.

38. The apparatus of claim 37, wherein the program is a Java applet.

39. The apparatus of claim 35, wherein the commands include Java script.

40. The apparatus of claim 33, wherein the user interface includes a web browser.

41. The apparatus of claim 33, wherein the user interface includes a thin client.

42. The apparatus of claim 33, wherein the user interface includes a network user interface adapted to provide navigation via hyperlinks.

43. A machine-readable medium encoded with a program for a remote computing platform interoperably connected to a network, the remote computing platform including a machine vision tool, said program comprising:
   preparing at least one presentation display to send via the network to a local computing platform including a user interface running on the local computing platform;
   receiving via the network an identifier of the machine vision tool from the local computing platform including the user interface;
   using the identifier received via the network, running the machine vision tool on the remote computing platform connected to the network;
   receiving output from the machine vision tool on the remote computing platform connected to the network, and placing the output in a form of the at least one presentation display for displaying via the user interface on the local computing platform accessible via the network; and
   sending via the network the at least one presentation display, including the output of the machine vision tool on the remote computing platform, to the local computing platform including the user interface,
   whereby the machine vision tool is remotely interoperable via the network.

44. The machine-readable medium of claim 43, wherein the prepared at least one presentation display includes commands for displaying the at least one presentation display using the user interface on the local computing platform accessible via the network.

45. The machine-readable medium of claim 44, wherein the commands for displaying the at least one presentation display include one of HTML commands and XML commands.

46. The machine-readable medium of claim 44, wherein the commands for displaying the at least one presentation display include a program to be executed by the user interface on the local computing platform accessible via the network.

47. The machine-readable medium of claim 46, wherein the program is a Java applet.

48. The machine-readable medium of claim 44, wherein the commands include Java script.

49. The machine-readable medium of claim 43, wherein the user interface includes a web browser.

50. The machine-readable medium of claim 43, wherein the user interface includes a thin client.

51. The machine-readable medium of claim 43, wherein the user interface includes a network user interface adapted to provide navigation via hyperlinks.

* * * * *